United States Patent [19]

Bathe

[11] Patent Number: 5,068,395

[45] Date of Patent: Nov. 26, 1991

[54] PROCESS FOR PRODUCING POLYMERIC PLASTICIZERS FROM POLYETHYLENE TEREPHTHALATE

[75] Inventor: Oscar M. Bathe, Woodridge, Ill.

[73] Assignee: Amoco Corporation, Chicago, Ill.

[21] Appl. No.: 514,429

[22] Filed: Apr. 25, 1990

[51] Int. Cl.$^5$ .................... C07C 67/10; C07C 69/82
[52] U.S. Cl. ................................ 560/90; 524/311; 560/78; 560/91
[58] Field of Search ............................ 560/91, 90, 78; 524/311

[56] References Cited

U.S. PATENT DOCUMENTS 4,268,686  5/1981  Schafer et al. .................... 560/91

Primary Examiner—Jose G. Dees
Assistant Examiner—Vera C. Clarke
Attorney, Agent, or Firm—Gunar J. Blumberg; William H. Magidson; Ralph C. Medhurst

[57] ABSTRACT

A process is disclosed for preparing polymeric plasticizers from polyethylene terephthalate which comprises reacting a trimellitic acid polyester ether with polyethylene terephthalate to prepare a nonlinear copolymer with hydroxyl functionality which is then reacted with a fatty acid of from 12 to 18 carbon atoms. The resulting composition has excellent properties as a polymeric plasticizer for polyvinylchloride resin.

12 Claims, No Drawings

PROCESS FOR PRODUCING POLYMERIC PLASTICIZERS FROM POLYETHYLENE TEREPHTHALATE

FIELD OF THE INVENTION

The field of this invention relates to polymeric plasticizers prepared from recovered polyester from waste material and is particularly concerned with the preparation of polymeric plasticizers wherein a trimellitic acid polyester ether of at least 500 molecular weight prepared from trimellitic acid or trimellitic anhydride and an alcohol and/or polyol is reacted with polyethylene terephthalate to prepare copolymers of trimellitic acid polyester ether and polyethylene terephthalate of a molecular weight within the range of from about 1000 to about 3000. These copolymers are liquids. The reaction products of these copolymers, with fatty acids, are useful as polymeric plasticizers for polyvinylchloride resins.

BACKGROUND OF THE INVENTION

This invention relates to recovery of polyester from waste materials, to the preparation of polymeric plasticizers from the recovered polyester and, in particular, to polymeric plasticizers for polyvinylchloride (PVC) resins which impart exceptionally desirable characteristics to the plasticized resin. Commercially available polymeric plasticizers are used in plasticizing polymers for use in films for packaging, wearing apparel, and disposable soft goods markets such as bottle cap liners and gaskets. Additional application areas include tubing, hose and related applications.

Polyesters, typically polyethylene terephthalate, are enjoying an increasing demand in the manufacture of not only fibers and films but also of containers for food and drink and of food packaging films owing to their favorable mechanical properties, transparency, heat resistance, electrical characteristics, and the like. Since such polyester containers and films, to a certain extent, function as gas barriers, their use is favored for the preservation of food and drink, as well as other applications requiring such barriers. However, the properties of polyesters, which cause their widespread use also result in the creation of vast quantities of polyester waste. The waste is generated as a by-product of the manufacturing process, i.e., as by-products from extrusion and forming of the polyester resin into finished articles and from the disposal of the used articles. Polyethylene terephthalate polymers are accordingly widely available as scrap photographic film and synthetic fibers, as sludges obtained as clean-up by-products from manufacturing plants, and as contaminated scrap from polyethylene terephthalate waste recovery sources such as bottle reclaiming plants.

For economically using the polyester wastes, there have been known methods, such as (1) utilizing the polyester wastes as they are for some purposes, (2) depolymerizing the polyester wastes to give starting materials useful for production of new polyesters, and (3) reacting the polyester wastes with polyols or polycarboxylic acids to give new polyesters.

Depolymerizing waste polyethylene terephthalate polyester by glycolysis of the polyester with excess ethylene glycol in the presence of water is taught in U.S. Pat. No. 4,078,143. Recovery of polyester waste with excess ethylene glycol at elevated temperatures by glycolysis of the polyester forms bis(2-hydroxyethyl) terephthalate and low molecular weight polymers thereof. Formation of glycol ethers, principally diethylene glycol, which copolymerize with the bis(2-hydroxyethyl) terephthalate, is a disadvantage of this method. Formation of the diethylene glycol can be inhibited by use of lithium acetate dihydrate in combination with zinc acetate dihydrate and/or antimony trioxide, as taught in U.S. Pat. No. 3,830,739. However, the results obtained in both U.S. Pat. Nos. 4,078,143 and 3,830,739 indicate the presence of diethylene glycol in the recovered polymers.

Other known digestion processes include treatment with low molecular weight polyols selected from the class consisting of diols and triols (U.S. Pat. No. 4,048,104); treatment with caustic monohydric alcohol (U.S. Pat. No. 3,728,287); treatment with monohydric alcohol and ester interchange catalyst (U.S. Pat. No. 3,488,298); heating with glycols and vinyl acetate (U.S. Pat. No. 3,857,799); heating with bis ester solvents (U.S. Pat. No. 3,884,850); and dissolving in ethylene glycol and/or terephthalic acid and/or dimethyl terephthalate (U.S. Pat. Nos. 3,907,868; 3,701,741; 3,703,488; 3,776,945; 3,257,335). The polyesters are taught as digested for reuse in the process of making additional polymers of molecular weights in excess of 15,000, that is, the digestion products are reintroduced into the process from which they originated or into other processes as a polyol ingredient to prepare other polymers.

Reacting the polyester wastes with polyols and/or polycarboxylic acids in the presence of a titanium catalyst to produce an oligomer and then polycondensing the resulting depolycondensation product with at least one polycarboxylic acid or an anhydride thereof and at least one polyol is taught in U.S. Pat. No. 3,951,886.

As noted hereinabove, the several methods for recovering scrap polyethylene terephthalate polyester to obtain new polyesters can result in the production of undesirable by-products, such as diethylene glycol and methanol, which contaminate the final product or require further purification before preparation of the new polyesters. Such processes can be costly and represent a significant increase in the cost of recovering scrap polyethylene terephthalate, even to the extent of causing the recovery process to be uneconomical in view of the comparable cost of producing virgin polyethylene terephthalic resin.

Accordingly, it is an object of this invention to provide a low-cost process for the recovery of polyethylene terephthalate waste wherein the product resulting therefrom is directly useful, without further purification to remove undesirable by-products before preparation of new polyesters.

It is further an object of this invention to provide a process for the preparation of polymeric plasticizers from polyethylene terephthalate waste which plasticizers have equivalent properties as compared with currently available polymeric plasticizers.

A further object of this invention is to provide a unique method for digesting polyester waste of polyethylene terephthalate which minimizes the production of by-products such as ethylene glycol, diethylene glycol, and methanol.

SUMMARY OF THE INVENTION

A process is disclosed for digestion of polyester waste comprising polyethylene terephthalate and for the preparation of high performance polymeric plasticizers thereby. The resulting plasticizers are suitable for plasticizing polyvinylchloride (PVC) resins. The plasticizers are compositions of nonlinear copolymers with at least 3 functional side-claims and fatty acids which impart unique properties to the plasticized polyvinylchloride resin.

DETAILS OF THE INVENTION

In general, it has been discovered that a polyester polymer comprising the reaction product of a tribasic polyester ether and polyester waste comprising polyethylene terephthalate can be prepared wherein the resulting polyester copolymer can be used to prepare high performance plasticizers. The novel aromatic polyester plasticizers are made by using recycled polyethylene terephthalate (PET). This can be any scrap residue from waste polyethylene terephthalate which contains compounds which have the moiety

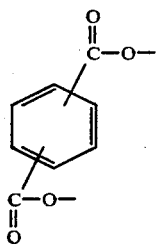

Generally, the scrap or recycled polyethylene terephthalate may be in any particulate form. A frequently seen form is fragmentized soft drink bottles which appear as clear or colored chips. Polyethylene terephthalate film can also be recycled. Any chopping or pulverizing process which produces small bits of solid PET from the larger, waste recycle article would be appropriate to produce scrap PET useful herein. Sometimes the scrap PET is mixed with a solvent to make a kind of slurry. While scrap PET slurry can be used in the method of this invention, the recycled PET chips without the solvent are also useful.

The amount of trimellitic acid polyester ether should be sufficient to digest all of the waste polyester to prepare the polyester polymer. Mole ratio of trimellitic acid polyester ether to polyethylene terephthalate is in the range of from about 1:1 to about 1:3. The resulting copolymer is a nonlinear liquid polymer with hydroxyl functionality useful for further reaction with fatty acids. This reaction will proceed rapidly at an elevated temperature at atmospheric pressure, although an elevated pressure can be used.

In one example of the process of this invention, a trimellitic acid polyester ether of at least 500 molecular weight and less than about 2500 molecular weight is reacted with polyester waste comprising polyethylene terephthalate to digest the polyethylene terephthalate and prepare in situ a polyester copolymer of molecular weight within the range of from about 1000 to about 3000. The trimellitic acid polyester ether is prepared in situ by reacting trimellitic anhydride or trimellitic acid with a polyol of molecular weight of from about 60 to about 650 and a linear alcohol of from 8 to about 18 carbon atoms, preferably 8 to 10 carbon atoms, in the presence of an esterification catalyst. The polyester copolymer is further reacted with a fatty acid to prepare a polymeric plasticizer for polyvinylchloride resin.

The polyester polymer of trimellitic anhydride and the polyol is a nonlinear polymer with at least 3 side chains and at least one hydroxyl group. Consequent unique properties in the plasticizers prepared therefrom are considered to be due to the side-chain configuration of the molecule.

The aromatic component of the polyester polymer can be either trimellitic anhydride or trimellitic acid, but trimellitic anhydride is preferred.

The esterification catalyst used to esterify the polyester polymer of trimellitic anhydride and polyethylene glycol can be any suitable esterification catalyst. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1, 3,3,-tetramethylguanidine, N,N,N',N'-tetramethyl-1,3-butanediamine, N,N-dimethyethanolamine, N,N-diethylethanolamine, and the like. The catalysts generally comprise from 0.1 to 20, and preferably from 0.3 to 10, weight percent of the total composition.

A particularly suitable catalyst has been found to be hydrated monobutyltin oxide, FASCAT (TM) 4100, available from M&T Chemicals, Inc. Rahway, N.J.

The polyols of the digesting medium desirably are low molecular weight polyols which can be aliphatic, cycloaliphatic, aromatic, araliphatic and/or heterocyclic and are preferably selected from the group consisting of diols and triols. Alkoxylated triols can be employed. More preferably, the polyol is an aliphatic dihydric alcohol which desirably has from 2 to 16 carbon atoms. The molecular weight of the digesting polyol advantageously ranges from about 60 to about 650. Examples of suitable diols include alkylene glycols and glycol ethers, such as ethylene, diethylene, oxydiethylene, propylene, dipropylene, oxydipropylene, butylene, pentylene, hexylene, octamethylene glycols, and isomeric forms thereof, and the polyoxyalkylene glycols such as polyoxyethylene and polyoxypropylene glycols, 1,4-bis-hydroxymethyl cyclohexane, dimethylol dicyclopentadiene, 1,3-cyclohexanediol, 1,4-cyclohexanediol, and in general hydroxy-terminated esters or mixed ether esters having a molecular weight of about 500 or less. The polyols may, of course, be used as mixtures of two or more polyols. The polyols may include substitutants which are inert in the digestion reaction, for example, chlorine and bromine substituents. Preferred polyols are polyoxyethylene glycols. Diethylene glycol and dipropylene glycol are also especially suitable.

In the process of this invention, trimellitic anhydride trimellitic acid is reacted with a polyol of from 2 to 16 carbon atoms and a linear alcohol of 8 to 10 carbon atoms, each in mole ratios of 1:1 and 1:3 to trimellitic anhydride, in the presence of an esterification catalyst to prepare a trimellitic acid polyester ether with at least 3 side chains and at least one hydroxyl group. The trimellitic acid polyester ether is thereupon reacted with polyethylene terephthalate to prepare a copolymer of the polyester ether and polyethylene terephthalate. The copolymer is thereupon reacted with a fatty acid of 12 to 18 carbon atoms in a mole ratio of about 1:1 to about 1:2 to prepare a plasticizer for polyvinylchloride resin.

The polyethylene glycol is preferably a Carbowax (TM) polyethylene glycol of a molecular weight range of from about 100 to about 650.

More preferred polyols are Carbowax (TM) polyethylene glycols, i.e., Carbowax (TM) 200, 400 and 600. These polyols are oxyalkylene polymers of molecular weights of about 180–220, 380–420, and 580–620, respectively.

The linear alcohol can be selected from the group consisting of n-octyl alcohol, n-decyl alcohol, and n-dodecyl alcohol.

The fatty acid can be selected from the group consisting of saturated acids, such as stearic, coconut and palmetic. A tall oil fatty acid comprising 4 to 28% rosin is suitable, but not preferred because of color.

In the production of plasticizers, known additives may be employed to increase the suitability of the polyester for particular applications. For example, in a typical formulation, additives such as ultraviolet and heat stabilizers may be employed. Other applications may require the use of pigments and lubricants, for reasons of appearance, performance and processing.

Generally, the preparation of the trimellitic acid polyester ether is at a temperature within the range of from about 350° F. to about 456° F. A catalyst is employed to drive the reaction to the desired low acid number in reasonable time. Preferably the temperature is in the range of from about 380° F. to about 450° F. The pressure can be atmospheric, sub-atmospheric or above atmospheric from greater than 1 to about 30 atmospheres.

The temperature of the reaction of the trimellitic acid polyester ether with the polyethylene terephthalate is within the range of from about 380° F. to about 500° F., preferably from about 450° F. to about 480°. Pressure can be sub-atmospheric, atmospheric, or above atmospheric from greater than 1 to about 30 atmospheres.

In summary, the instant invention comprises a process for the preparation of plasticizer compositions comprising the reaction product of a trimellitic acid polyester ether and a polyol of a molecular weight ranging from about 60 to about 650, a linear alcohol of 8 to 10 carbon atoms, a fatty acid of 12 to 18 carbon atoms, and polyethylene terephthalate, which process comprises: (a) preparing a trimellitic acid polyester ether of at least 500 molecular weight and less than about 2500 molecular weight with at least 3 side chains and at least one hydroxyl group, by reacting trimellitic anhydride or trimellitic acid with a polyol of 2 to 16 carbon atoms and molecular weight of from about 60 to about 650 in a mole ration of from about 1:1 to about 1:3, trimellitic anhydride or trimellitic acid to said polyol, and an alcohol of from 8 to 12 carbon atoms in a mole ratio of about 1:1 to about 1:3 trimellitic anhydride or trimellitic acid, to said alcohol of 8 to 12 carbon atoms in the presence of an esterification catalyst at a temperature within the range of from about 380° F. to about 460° F. at a pressure ranging from about 1 to about 30 atmospheres; (b) reacting in situ said trimellitic acid polyester ether with polyethylene terephthalate at a temperature within the range of from about 380° F. to about 500° F., a pressure from about 1 to about 30 atmospheres, wherein mole ratio of said trimellitic acid polyester ether to said polyethylene terephthalate is in the range of from about 1:1 to about 1:2; to prepare a copolymer of trimellitic acid polyester ether and polyethylene terephthalate of a molecular weight within the range of from about 1000 to about 3000 with at least 3 side chains, and an acid number of from about 5 to about 10; and (c) reacting said copolymer of said trimellitic acid polyester ether and polyethylene terephthalate with a fatty acid of from about 12 to about 18 carbon atoms in a mole ratio to said copolymer of from about 1:1 to about 1:2.

The instant invention preferably comprises a process wherein the mole ratio of trimellitic anhydride or trimellitic acid to said polyol is in the range of from about 1:1 to about 1:2; mole ratio of said trimellitic anhydride or trimellitic acid to said alcohol is from about 1:1 to about 1:2, and mole ratio of said trimellitic acid polyester ether to said fatty acid is from about 1:1 to about 1:2.

The polyol can be selected from the group consisting of ethylene glycol, diethylene glycol, propylene glycol, dipropylene glycol, oxydipropylene glycol, butylene glycol, pentylene glycol, hexyleneglycol, octamethylene glycols, polyoxyethylene glycols, polyoxypropylene glycols, 1,4-bis-hydroxymethyl cyclohexane, dimethylol dicyclopentadiene, 1,3-cyclohexanediol; 1,4-cyclohexanediol and mixtures thereof. The said polyol preferably is selected from the group consisting of ethylene glycol, propylene glycol and polyoxyethylene glycol. More preferably the said polyol is a polyoxyethylene glycol.

The linear alcohol can be selected from the group consisting of n-octyl alcohol, n-decylalcohol and n-dodecylalcohol.

The fatty acid can be selected from the group consisting of stearic acid, coconut acid and palmetic acid.

The said esterification catalyst is selected from the group consisting of organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium. Preferably, the said esterification catalyst is hydrated monobutylin oxide.

The said polyethylene terephthalate can be in a particulate form comprising chopped and/or fragmentized solid particles. The said polyethylene terephthalate can be in the form of a slurry prepared by adding said polyethylene terephthalate to a solvent.

The resulting plasticizer composition typically comprises the reaction product of: (a) a copolymer of a trimellitic acid polyesterether of at least 500 molecular weight and less than 2500 molecular weight and polyethylene terephthalate wherein said copolymer has a molecular weight within the range of from about 1000 to about 3000 and is a nonlinear copolymer with at least 3 functional side chains and at least one hydroxyl group; (b) a fatty acid of from about 8 to about 18 carbon atoms, in a mole ratio to said copolymer of from about 1:1 to about 1:2.

The following examples are illustrative of the process of the instant invention and are not to be construed as limiting the scope of the invention.

EXAMPLE I

Three aromatic polyester polyols were prepared. The trimellitic acid polyester ethers were prepared using Carbowax( TM ) 200, 400, and 600, products of Union Carbide Corporation, New York, N.Y. The mole ratios of the materials are shown in Table I.

TABLE I

| Materials | Polyester No. 1 | Polyester No. 2 Moles | Polyester No. 3 |
|---|---|---|---|
| Trimellitic Anhydride | 1.0 | 1.0 | 1.0 |
| Polyethylene Glycol "200" | 3.0 | | |
| Polyethylene Glycol "400" | | 3.0 | |
| Polyethylene Glycol "600" | | | 3.0 |

The trimellitic acid polyester ether polyols were synthesized by the one-stage method at a maximum temperature of 450° F. (232° C.). Fascat (TM) 4100, an esterification catalyst, was employed to drive the reaction to the low acid number desired in a reasonable time. The reactants were charged to a four-liter glass reaction kettle equipped with mechanical agitation, a nitrogen sparge, a packed partial steam condenser, a cold water total condenser, and thermometers for monitoring both kettle and overheat temperature. When the overhead temperature fell to 194° F. (90° C.), the steam condenser was removed. A Barrett trap was immediately installed in the open kettle port and attached directly to the cold water total condenser. As the reaction neared completion, the nitrogen sparge rate was increased (as high as 2.5 cfm), and any significant glycol lost was added back to obtain the low acid number required. Once the reaction was completed, cooling of the resin was started.

After the resin cooled to 302° F. (150° C.), PET scrap was charged into the reaction kettle. The mixture was then heated to 482° F. (250° C.) and held at that temperature for 4 hours. The digested scrap polymer was then cooled and evaluated for physical properties.

Table II illustrates polymer formulations to improve compatibility with polyvinylchloride and to change physical performance.

TABLE II

| | Polymeric Plasticizer Formulations in Moles | | | |
|---|---|---|---|---|
| | Sample No. | | | |
| | MRR-48 | MRR-49 | MRR-50 | MRR-51 |
| Trimellitic Anhydride | 1.0 | 1.0 | 1.0 | 1.0 |
| Diethylene Glycol | 2.0 | 1.0 | 1.0 | 2.0 |
| Decyl Alcohol | 1.0 | 2.0 | | |
| PET | 2.0 | 1.0 | 1.0 | 2.0 |
| Tall Oil Fatty Acid | 2.0 | 1.0 | 1.0 | 2.0 |
| Carbowax 350 | | | 2.0 | 1.0 |
| Appearance | clear | slight haze | clear | clear |
| Final Acid No. | <5 | <5 | 3–4 | <5 |

EXAMPLE II

The procedure of Example I was repeated to prepare polymeric plasticizers of several formulations. Details as to the formulations and results are in Table III.

TABLE III

| | Polymeric Plasticizer Formulations In Moles | | | | | | |
|---|---|---|---|---|---|---|---|
| | Sample No. | | | | | | |
| | MRR 49 | MRR 49D | MRR 50 | MRR 61 | MRR 63A | MRR 64 | BGC-1 |
| Trimellitic Anhydride | 1.0 | 1.0 | 1.0 | 1.0 | 1.0 | 1.0 | 1.0 |
| Diethylene Glycol | 1.0 | 1.2 | 1.0 | 1.1 | 1.2 | 1.1 | 1.1 |
| Carbowax 350 | | | 2.0 | 1.0 | | 1.0 | 1.0 |
| Decyl Alcohol | 2.0 | 2.1 | | 1.1 | 2.1 | 1.1 | 1.1 |
| PET | 1.0 | 1.0 | 1.0 | 1.0 | 1.0 | 1.0 | 1.0 |
| Tall Oil Fatty Acid | 1.0 | 0.9 | 1.0 | 0.9 | | | |
| Coconut Fatty Acid | | | | | 1.0 | 1.0 | |
| Stearic Acid | | | | | | | 1.0 |
| Results | | | | | | | |
| Appearance | | | | | | | |
| Cloudy | X | | | | | | |
| Clear | | X | X | X | X | X | |
| Cloudy Jelly | | | | | | | X |
| Final Acid No. | 9–10 | 8–9 | 3–4 | 4–5 | 8–9 | 8–9 | 8–9 |

EXAMPLE III

Compounds MRR-61, MRR-49D, and MRR-64 were evaluated as plasticizers in a polyvinylchloride formulation. A formulation containing a commercially available polymeric plasticizer, Paraplex G-54, Rohm and Haas, Philadelphia, Pa., was also prepared. Dry blends of the plasticizers were prepared in a Hobart rotary mixer. The dry blends were then placed on a rubber mill. The roll speed was 35 ft./min. The roll temperature was 325°–330° F. A 1-minute preheat and an 8-minute working time was used to prepare the samples. The resin formulation is in Table IV.

TABLE IV

| PLASTICIZER FORMULA | |
|---|---|
| | Wt. |
| PVC, Geon 30 | 100 |
| Plasticizer | 40–62 |
| Stabilizer, Mark 2109 | 2.5 |
| Stearic Acid | 0.5 |

Note:
GEON 30, product of B. F. Goodrich Chemical Co., Cleveland, OH.
Mark 2109, product of Argus Chemical Corp., Brooklyn, NY.

The resulting formulations were then evaluated as to carbon volatility, hexane extraction, mineral oil extraction, soapy water extraction, and tensile strength. Results are in Table V.

TABLE V

Evaluation of Polymeric Plasticizers

|  | MRR-61 | | | MRR-49D | MRR-64 | G-54* |
|---|---|---|---|---|---|---|
| PHR | 40 | 50 | 62 | 62 | 62 | 62 |
| Carbon Volatility - 90° C.** | | | | | | |
| After 24 hrs. | 1.19 | 1.53 | 1.66 | 1.32 | 2.85 | 0.66 |
| After 48 hrs. | 1.64 | 2.08 | 2.62 | 1.90 | 3.00 | 0.92 |
| Hexane Extraction - 23° C.** | | | | | | |
| After 24 hrs. | 0.72 | 1.56 | 2.22 | −5.68 | +0.70 | 1.50 |
| After Post Cure*** | 0.51 | +1.10 | +1.73 | −9.15 | +0.38 | +1.02 |
| Mineral Oil Extraction - 70° C.** | | | | | | |
| After 24 hrs. | 2.28 | 3.29 | 4.93 | 4.32 | 5.36 | 1.99 |
| Soapy Water Extraction - 90° C.** | | | | | | |
| After 48 hrs. | 7.16 | 10.39 | 15.10 | 6.83 | 14.23 | 5.03 |
| After 72 hrs. | 8.46 | 12.61 | 16.67 | 7.93 | 15.84 | 6.78 |
| Tensile Strength, psi | | | | | | |
| 100% Modulus | 2661 | 2331 | 1716 | 1740 | 1621 | 1444 |
| 300% Modulus | 3343 | 3100 | 2666 | — | — | 2448 |
| Break Strength | 3439 | 3241 | 2835 | 2333 | 2904 | 2733 |
| % Elongation | 305 | 330 | 345 | 268 | 315 | 365 |

*Paraplex G-54, Rohm and Haas, Philadelphia, PA
**Percent loss
***Post cure comprised 20 minutes at 90° C., ambient pressure.

That which is claimed is:

1. A process for the preparation of plasticizer compositions which comprise the reaction product of recovered polyethylene terephthalate and a trimellitic acid polyester ether to form a copolymer, the said polyester ether being prepared from trimellitic anhydride or trimellitic acid, a polyol of a molecular weight ranging from about 60 to about 650, and a linear alcohol of 8 to 10 carbon atoms, the said copolymer being reacted with a fatty acid of 12 to 18 carbon atoms, which process comprises:

(a) preparing a trimellitic acid polyester ether of at least 500 molecular weight and less than about 2500 molecular weight with at least 3 side chains and at least one hydroxyl group by reacting trimellitic anhydride or trimellitic acid with a polyol of 2 to 16 carbon atoms and molecular weight of from about 60 to about 650 in a mole ratio of about 1:1 to about 1:3, trimellitic anhydride or trimellitic acid to said polyol, and an alcohol of from 8 to 12 carbon atoms in a mole ratio of about 1:1 to about 1:3, trimellitic anhydride or trimellitic acid to said alcohol of 8 to 10 carbon atoms, in the presence of an esterification catalyst at a temperature within the range of from about 380° F. to about 460° F. at a pressure ranging from about 1 to about 30 atmospheres;

(b) reacting in situ said trimellitic acid polyester ether with recovered polyethylene terephthalate at a temperature within the range of from about 380° F. to about 500° F., a pressure from about 1 to about 30 atmospheres, wherein mole ratio of said trimellitic acid polyester ether to said recovered polyethylene terephthalate is in the range of from about 1:1 to about 1:2, to prepare a copolymer of trimellitic acid polyester ether and recovered polyethylene terephthalate of a molecular weight within the range of from about 1000 to about 3000 with at least 3 side chains, and an acid number of from about 5 to about 10; and (c) reacting said copolymer of said trimellitic acid polyester ether and recovered polyethylene terephthalate with a fatty acid of from about 12 to about 18 carbon atoms in a mole ratio of from about 1:1 to about 1:2, said copolymer to said fatty acid, at a temperature within the range of from about 380° F. to about 500° F. at a pressure ranging from about 1 to about 30 atmospheres.

2. The process of claim 1 wherein mole ratio of said trimellitic anhydride or trimellitic acid to said polyol is from about 1:1 to about 1:2, mole ratio of said trimellitic anhydride or trimellitic acid to said alcohol is from 1:1 to about 1:2, to prepare said trimellitic acid polyester ether, and mole ratio of said trimellitic acid polyester ether to said fatty acid is from about 1:1 to about 1:2.

3. The process of claim 1 wherein said polyol is selected from the group consisting of ethylene glycol, diethylene glycol, oxydiethylene glycol, propylene glycol, dipropylene glycol, oxydipropylene glycol, butylene glycol, pentylene glycol, hexylene glycol, octamethylene glycols, polyoxyethylene glycols, polyoxypropylene glycols, 1,4-bis-hydroxymethyl cyclohexane, dimethylol dicyclopentadiene, 1,3-cyclohexanediol, 1,4-cyclohexanediol and mixtures thereof.

4. The process of claim 1 wherein said polyol is a polyoxyethylene glycol of molecular weight ranging from about 100 to about 650.

5. The process of claim 1 wherein said linear alcohol is selected from the group consisting of n-octyl alcohol, n-decyl alcohol and n-dodecyl alcohol.

6. The process of claim 1 wherein said fatty acid is selected from the group consisting of stearic acid, coconut acid, palmitic acid and tall oil fatty acid.

7. The process of claim 1 wherein said esterification catalyst is selected from the group consisting of organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium.

8. The process of claim 1 wherein said esterification catalyst is hydrated monobutylin oxide.

9. The process of claim 1 wherein said polyethylene terephthalate is in a particulate form consisting chopped and/or fragmentized solid particles.

10. The process of claim 1 wherein said polyethylene terephthalate is in the form of a slurry prepared by adding said polyethylene terephthalate to a solvent.

11. A plasticizer composition prepared by the process of claim 1 comprising the reaction product of trimellitic anhydride or trimellitic acid, a polyol of molecular weight ranging from abut 60 to about 650, and a linear alcohol of from 8 to 12 carbon atoms wherein mole ratio of said trimellitic anhydride or trimellitic acid to said polyol is from about 1:1 to about 1:3, and mole ratio of said trimellitic anhydride or trimellitic acid to said alcohol of 8 to 10 carbon atoms is from about 1:1 to about 1:3, to prepare a trimellitic acid polyester ether of at least 500 molecular weight and less than about 2500 molecular weight wherein said polyester ether is reacted with recovered polyethylene terephthalate in a mole ratio of from about 1:1 to about 1:2, said polyester ether to said recovered polyethylene terephthalate, to prepare a copolymer wherein said copolymer is reacted with a fatty acid of from about 12 to about 18 carbon atoms to prepare said plasticizer composition.

12. The plasticizer composition of claim 11 wherein said polyol is a polyethylene glycol of molecular weight of from about 100 to about 650, said alcohol is selected from the group consisting of n-octyl alcohol, n-decyl alcohol, and n-dodecyl alcohol, and said fatty acid is selected from the group consisting of stearic acid, coconut oil acid, palmitic acid and tall oil fatty acid.

* * * * *

UNITED STATES PATENT OFFICE
CERTIFICATE OF CORRECTION

Patent No. 5,068,395              Dated November 26, 1991

Inventor(s) Oscar M. Bathe

It is certified that error appears in the above-identified patent and that said Letters Patent is hereby corrected as shown below:

| Col. | Line |
|---|---|
| 8 | 21 (in table) "BGC-1" should read --BGC-1-- |
| 10 | 61 "form consisting" should read --form comprising-- |

Signed and Sealed this

Twenty-seventh Day of April, 1993

*Attest:*

MICHAEL K. KIRK

*Attesting Officer*     *Acting Commissioner of Patents and Trademarks*